US008643475B1

(12) United States Patent
Kohno et al.

(10) Patent No.: US 8,643,475 B1
(45) Date of Patent: Feb. 4, 2014

(54) RADIO FREQUENCY IDENTIFICATION SECRET HANDSHAKES

(75) Inventors: Tadayoshi Kohno, Seattle, WA (US); Alexei Czeskis, Seattle, WA (US); Karl Koscher, Seattle, WA (US); Joshua R Smith, Seattle, WA (US)

(73) Assignee: University of Washington through its Center for Commercialization, Seattle, WA (US)

( * ) Notice: Subject to any disclaimer, the term of this patent is extended or adjusted under 35 U.S.C. 154(b) by 269 days.

(21) Appl. No.: 12/759,133

(22) Filed: Apr. 13, 2010

Related U.S. Application Data

(60) Provisional application No. 61/168,842, filed on Apr. 13, 2009.

(51) Int. Cl.
*H04Q 5/22* (2006.01)

(52) U.S. Cl.
USPC ....... 340/10.51; 340/1.1; 340/10.1; 340/10.5; 340/10.52; 340/13.25; 726/1; 726/4; 726/5; 726/9; 235/380; 235/492

(58) Field of Classification Search
USPC .................. 340/1.1, 10.1, 10.5–10.52, 13.25, 340/13.26; 726/1, 4, 5, 9, 17, 20–22, 726/26–33; 235/380, 492; 345/156, 158; 713/182; 463/29; 715/863
See application file for complete search history.

(56) References Cited

U.S. PATENT DOCUMENTS

| | | | | |
|---|---|---|---|---|
| 5,598,187 A | * | 1/1997 | Ide et al. | 345/158 |
| 2006/0054708 A1 | * | 3/2006 | Koo et al. | 235/492 |
| 2006/0136997 A1 | * | 6/2006 | Telek et al. | 726/5 |
| 2006/0256074 A1 | * | 11/2006 | Krum et al. | 345/156 |
| 2007/0139199 A1 | * | 6/2007 | Hanlon | 340/572.1 |
| 2008/0009345 A1 | * | 1/2008 | Bailey et al. | 463/29 |
| 2008/0052522 A1 | * | 2/2008 | McArdle | 713/182 |
| 2009/0031258 A1 | * | 1/2009 | Arrasvuori et al. | 715/863 |

OTHER PUBLICATIONS

Vulnerabilities in First-Generation RFID-enabled Credit Cards*, Heydt-Benjamin, Thomas S. et al., S. Dietrich and R. Dhamija (Eds.): FC 2007 and USEC 2007, LNCS 4886, pp. 2-14, 2007 IFCA / Springer-Verlin Berlin Heidlberg 2007.*

* cited by examiner

*Primary Examiner* — Steven Lim
*Assistant Examiner* — Sisay Yacob
(74) *Attorney, Agent, or Firm* — Christensen O'Connor Johnson Kindness PLLC

(57) ABSTRACT

An approach for defending radio frequency identification (RFID) tags and other contactless cards against ghost-and-leech (a.k.a. proxying, relay, or man-in-the-middle) attacks incorporates gesture recognition techniques directly implemented with the RFID tags or contactless cards. These tags or cards will only engage in wireless communications when they internally detect "secret handshakes." A secret handshake recognition system is implemented on a passive WISP RFID tag having a built-in accelerometer. This approach is backward compatible with existing deployments of RFID tag and contactless card readers and is also designed to minimize the changes to the existing usage model of certain classes of RFID and contactless cards, such as access cards that are kept in a wallet or purse, by enabling execution of secret handshakes without removing the card. This novel approach can also improve the security and privacy properties in other uses of RFID tags, e.g., contactless payment cards.

15 Claims, 6 Drawing Sheets

RADIO FREQUENCY IDENTIFICATION SECRET HANDSHAKES

CROSS-REFERENCE TO RELATED APPLICATIONS

This application claims priority to and the benefit of co-pending U.S. provisional patent application Ser. No. 61/168,842, filed Apr. 13, 2009, which application is hereby incorporated by reference herein in its entirety.

GOVERNMENT RIGHTS

This invention was made with government support under Grant No. CNS-0326546 awarded by the National Science Foundation (NSF). The government has certain rights in the invention.

BACKGROUND

Radio frequency identification tags (RFIDs) and other contactless cards (such as proximity cards and contactless smartcards) are increasing in ubiquity. For example, large corporations often use RFIDs or proximity cards to regulate building access. American Express, VISA, and MasterCard all produce credit cards with embedded RFID tags. Many car keys also have embedded RFID tags to help protect against hot-wiring. While the security community has invested significant resources in understanding and addressing the security deficiencies of such cards—including documented attacks against and defensive recommendations for each of the above examples—there exists one class of attacks that the community is still battling: the so-called ghost-and-leech attacks.

Figure 1A:
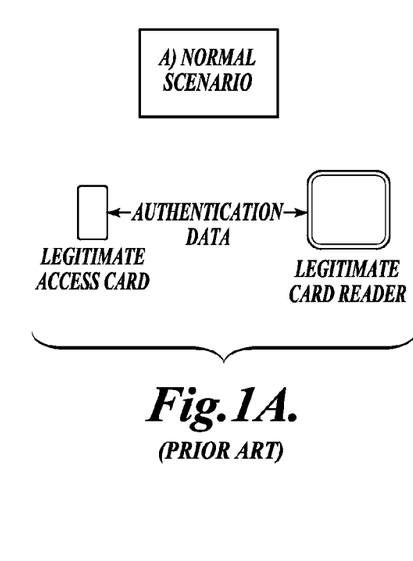
FIGS. 1A and 1B illustrate a typical authentication session with contactless card, where the arrows represent data flow, FIG. 1A showing a normal scenario, and FIG. 1B showing an exemplary ghost-and-leech attack, wherein the ghost emulates a card and the leech emulates a reader (the ghost-and-leech attack is also often referred to as a man-in-the-middle attack or a relay attack)
Figure 1B:
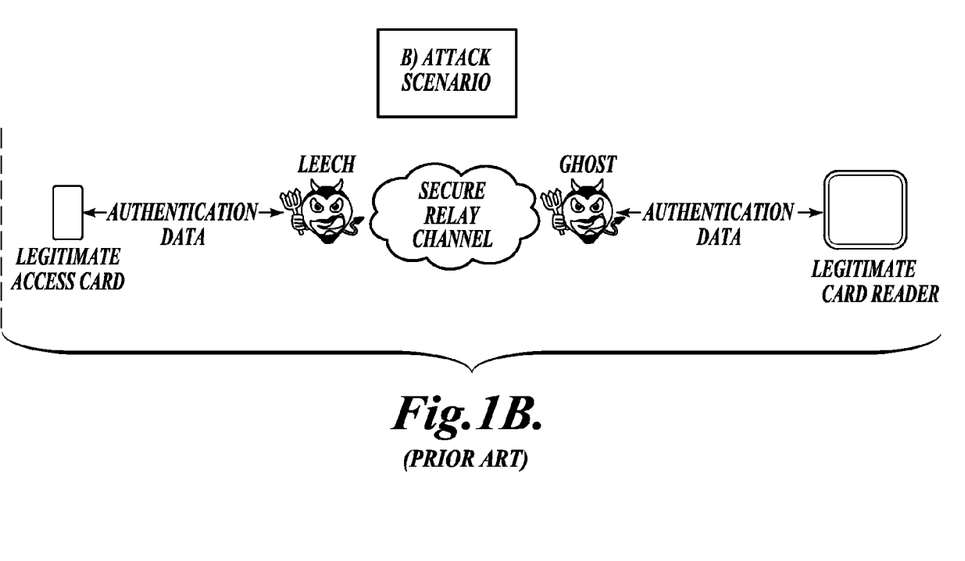

The phrase "ghost-and-leech attack" was coined in 2005 by Z. Kfir et al., but more general relay attacks have been known for over 30 years. A key challenge with RFIDs and other contactless cards is that they are indiscriminate with respect to the external devices with which they wirelessly communicate. A ghost-and-leech attack exploits this indiscriminatory nature as follows. Consider, for example, the case where an RFID or proximity access card (or access badge) is used to gain entry into a building. Under a normal usage scenario, an employee might keep an access card in a wallet, walk up to the door, take the wallet out of a pocket, and then place the wallet near the reader, thereby triggering the reader to unlock the door and grant the employee entry, as illustrated in FIG. 1A. To mount a ghost-and-leech attack, two attackers—the ghost and the leech—will coordinate their activities as shown in FIG. 1B. The ghost places attack equipment near the door's reader, and the leech places other attack equipment near the employee's wallet, perhaps, as the employee rides the bus or train to work or stands in line at a local coffee shop. By relaying all communications between the reader and the employee's access card, the ghost can surreptitiously gain access to the building.

One can apply similar ghost-and-leech attacks to other uses of RFID tags and contactless cards. Moreover, anti-cloning and strong cryptographic mechanisms cannot by themselves protect against the ghost-and-leech attack. This consequence follows naturally from the behavior of the ghost and leech, i.e., the ghost and leech do not need to modify, tamper with, or inspect the contents of the communications between the reader and an employee's access card—the ghost and leech simply need to relay the communications in a black-box manner. The inability for cryptography to defend against the ghost-and-leech attack creates a conundrum, and the solutions that are typically used require either sophisticated processing on the reader or sometimes, obtrusive changes to the usage model of the RFID or contactless card. As an example of the former, one solution—known as distance bounding—is for the reader to gauge the physical proximity of the RFID or contactless card by measuring the time it takes for the tag or card to respond to challenge messages. The assumption here is that the ghost's and leech's proxying step will introduce non-negligible time delays. As an example of the latter, some vendors are producing access cards with buttons that users must press in order to activate them, and third-party vendors are selling protective metallic sleeves that block contactless communications.

Wireless identification service point (WISP) RFID tags are a powerful tool for implementing stronger security mechanisms on passive RFID devices. Researchers have demonstrated that it is possible to implement RC5 on the WISPs and have shown how WISP-like technologies could improve the security and privacy of implantable medical devices.

Others have shown that a large number of possible approaches can be applied to reducing the risk of fraud and privacy invasions associated with RFID credit cards, including the use of more sophisticated cryptographic techniques, protective sleeves, and buttons on the cards. Among these defensive approaches, there is conjecture that motion sensors on an RFID card could detect the telltale tap-and-go motion typically associated with RFID credit card purchases. This shared conjecture might be applied to solidify a model for context-aware communications—even on an existing passive RFID tag.

Based on the discussion above, it would be desirable to disable communications and other activities while a device (i.e., RFID tag or contactless card) is in the context of day-to-day activities, i.e., to only enable communications during specific authentication activities associated with, for example, attempting to gain legitimate entry to a building. In contrast, the prior art approach is to enable actions in day-to-day activities like walking, in response to the motion detected. Clearly, further development will be useful in achieving a robust approach that is usable with RFID tags and other contactless cards to protect against ghost-and-leech attacks and other such undesired attacks.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology that follows is to be imputed to the examples shown in the drawings and discussed herein.

The Ghost and Leech Attack

As illustrated in FIGS. 1A and 1B, a pair of attackers—the ghost and the leech—mount a ghost-and leech attack by relaying communications between a legitimate RFID or contactless card and a legitimate reader. The ghost-and-leech attack vector is practical and has been successfully demonstrated against proximity door-access cards, though one could also apply the ghost-and-leech attack to other tags and cards like SpeedPass™ and credit cards if those devices didn't already use weak or nonexistent cryptography. In addition to these examples, there are demonstrable ghost-and-leech attacks to non-contactless systems, such as UK's EMV payment system.

One goal of the present approach is to reduce the vulnerability of RFID tags and contactless cards to ghost-and-leech attacks, while not significantly impacting the usage model for these tags and cards and not requiring changes to existing, deployed readers. It is assumed that the attackers have complete control over the radio environments surrounding both the legitimate RFID tag or contactless card and the reader. For a threat model, attacks in which one of the attackers is in physical possession of the card are not explicitly considered. For example, this approach does not consider attacks in which one of the attackers steals or temporarily borrows the card, or when one of the attackers is also the legitimate owner of the card wishing to grant remote building access to a conspirator while the owner of the card is at a public event for alibi purposes.

Known cryptographic techniques or anti-cloning mechanisms are unable to prevent ghost-and-leech attacks because the attackers only need to relay communications in order to mount such an attack (and not modify those communications or generate new communications). Several alternate suggestions have therefore been proposed for combating the ghost-and-leech attack. One standard solution is to use multi-factor authentication (e.g., requiring a PIN or password when swiping a card, requiring a biometric scan, or both). Active (battery-backed) tags incorporating some of these features are commercially available. Other approaches include sleeves that require the tag to be removed or a button to be pressed in order to enable the tag to be read. However, these are rare in practice and change the usage model dramatically. A potential approach relies on tight timing constraints between the reader request and the card's reply, based on the fact that the ghost-and-leech attack will introduce some delay. However, this requires fine-grained timing mechanisms, modifications to existing readers, and is difficult to achieve with today's hardware.

The present approach seeks to improve the resistance of RFIDs and contactless cards to ghost-and-leech attacks subject to the following two central design constraints:

Backward Compatibility: The present novel solution should not require modifications to existing, deployed RFID or access card readers.

Consistent Usage Model: This novel solution should require little or no change to the usage model of existing RFIDs and contactless cards.

By focusing on these two principle goals, a unique balance in the design space is provided for defending against the ghost and-leech attack—a solution that is both incrementally deployable today without modifying existing readers, and that does not require users to, for example, remove an access card from their wallet and press a button before entering a building.

An additional goal of the novel system is that it be composable with other defensive mechanisms, like distance bounding on the reader. This composability will enable a deployment to layer both mechanisms, thereby providing a greater in-depth defense.

Novel Approach: Secret Handshakes

The intuition behind an exemplary technical approach used herein is the following. Consider the standard usage scenario of an RFID or contactless card. When an employee wishes to enter an access-controlled building, the employee often subconsciously does a fixed set of motions to gain entry—the employee reaches for his wallet, draws the wallet near the door's reader, and pauses. Similarly, when an employee wishes to start a car, the employee takes the key out of a pocket or purse, inserts it into the key shaft, and twists. The observation that can be made is that if it were possible for the RFID chip or contactless technology in the access card or car key to somehow internally detect exactly when these actions were being performed, then it would be possible to create logic on the tags and cards that would only allow the tags and cards to communicate while these actions are being performed. This approach is called context-aware communications.

Context-aware communications must provide two properties to be useful in practice. Namely, (1) the false negative rate must be low, meaning that a person should with high probability be able to enter a building or start a car using the RFID tag or contactless card on the first try. At the same time, (2) the false positive rate on the RFID tag or contactless card must also be low, meaning that there should be little chance for the access card or car key to accidentally conclude that the person is trying to gain entry or start his car when in fact he is not. While some motions (like key insert and twist) are relatively unlikely to occur accidentally, other motions (like taking one's wallet out of one's pocket) are more likely to occur when a person is not actually trying to gain entry to a building. The risk with false positives is clear: any situation leading to a false positive could potentially be exploited by a ghost-and-leech adversary.

The present, new approach—called secret handshakes—reduces the false positive rate. In particular, the approach involves the creation of special movements for the RFID tag or contactless cards—movements that are highly unlikely to occur naturally in one's day-to-day activities but that are easy to perform within a short period of time (less than one second) and that do not require direct physical manipulation of the card (e.g., no pressing a button). For example, one of the secret handshakes, which is referred to as 1.5-wave, would simply have a person wave their wallet (holding the RFID tag or contactless card) from left-to-right-to-left near a building's card reader, to gain access.

Survey of Access Card Users

While achieving context-aware communications with no modifications to the normal usage model is clearly ideal, it is evident that minor usage modifications like 1.5-wave offer many advantages over traditional solutions, such as solutions involving placing buttons on the cards or placing the cards in metal sleeves. Indeed, a survey of 554 people found that, of the 191 people who used a single contactless access card, 123 (64.4%) kept those cards in their billfold or purse wallets and placed those wallets in front of the access reader to gain entry. The 1.5-wave secret handshake introduces few modifications to how those participants currently use their access cards. Additionally, of the 232 participants who used a single contact-based access card (e.g., a magnetic stripe card), 159 (68.5%) kept that card in their billfold or purse wallet when not being used, suggesting that these participants would benefit from the present novel approach if they were required to switch to contactless access cards. Further results from this survey are discussed below.

Secret handshakes (aka unlocking gestures) can be used in combination with other methods for unlocking the card/RFID (after which the card/RFID might reply to requests, etc). For example, the card/RFID could require all of a multitude of unlocking methods: secret handshakes and a button and a finger press (via capacitive sensing)—i.e., all of them are required. Or the card/RFID could require one of secret handshakes or button press or finger press (via capacitive sensing).

Prototype Implementation and Evaluation

In one embodiment of the present novel approach, context-aware communications and secret handshake detection are implemented on the WISP UHF RFID tag, which is a passive (batteryless) RFID tag with a built-in accelerometer and modest computational capabilities. The existence of this accelerometer enables use of simple activity recognition techniques to infer whether the holder of that tag is performing a secret handshake, and to only respond to external RF communications after internally recognizing that handshake. An exemplary implementation uses a variant of cross-correlation written in auto-generated, highly-optimized C code. It was experimentally verified, with three participants, that this novel approach was effective, allowing the participants to trigger the 1.5-wave secret handshake recognition system—with zero attempts failing out of 50 total attempts—while simultaneously reducing the risk of exposure to ghost-and-leech attacks.

Extensions

The present novel approach—while targeted at protecting against ghost-and-leech attacks—can also help improve the resistance of RFID tags and contactless cards to location tracking attacks and the leakage of other private information. For example, it is currently possible to sit next to someone in a bar and surreptitiously read their RFID credit card account number and other information, or to place RFID readers in many locations and track someone's location by monitoring consistent identifiers. While there exist cryptographic approaches for improving resistance to these attacks, those solutions require modifications to both the tags and the readers or back-end systems. A separate approach is to use an external device, like a "blocker tag." Secret handshakes serve as a tag local approach for limiting the exposure to these attacks.

As a related example, consider a scenario in which a person has multiple cards in their wallet, e.g., a transit (bus) card, a credit card, and a gym card, all of which for backward compatibility purposes reveal private information when read. Using secret handshakes could prevent the driver of a bus from surreptitiously reading the person's credit card number while the person waves their wallet near the reader on the bus.

Alternate Approaches

In another embodiment, when it can be assumed that the standard usage model involves a person physically touching their RFID tag or card to a reader, a capacitive sensing WISP RFID tag is used to detect when the tag is being held in someone's hand, and varies the RF communications and other activities accordingly. It is noted that a capacitive sensing approach is likely more durable than a physical button because of the lack of moving parts.

Context-Aware Communication—Inferring Context

As indicated above, several key goals motivated development of a ghost-and-leech protection system, including the following utility, deployment, and security considerations:

i. Consistency of usage model;
    ii. Backward compatibility with existing, deployed readers;
    iii. Cost-effectiveness;
    iv. Composability with other defensive mechanisms like reader-side distance bounding;
    v. Utility, e.g., in the case of access badges Bob shouldn't be denied entry; and
    vi. Attack resistance: the system should provide low exposure to ghost-and-leech attacks.

The following discusses an overall approach for simultaneously meeting all of these goals. This approach is referred to as "context aware communications," since an RFID tag or contactless card should only engage in communications when the user actually desires this action—i.e., when the context is correct.

There are a broad range of potential techniques for an RFID tag or card to determine whether the context is appropriate for communications.

A button would clearly meet the goal of ensuring reader-side backward compatibility, utility, and security goals. The use of PINS or biometrics (whether on the card or on the reader) would also be a possible solution. In one embodiment of the current invention, Secret Handshakes are combined with one or more of a button, PINS, or biometrics to achieve strengthened security.

It is desirable to transparently infer whether the user is in a legitimate authentication context. Here, the fact that users move the RFID tag or contactless card in relatively unique ways during authentication can be leveraged; they may twist their hip, wave their wallet, tap the tag or card against the reader, or insert and twist a car key. By placing an accelerometer on an RFID tag or contactless card, it is possible to passively and transparently capture the physical information describing these movements. Then the tag or card can be limited to communicate only in valid authentication contexts. This result significantly reduces the access card's exposure to ghost-and-leech attacks, provided that the authentication context is not frequently detected during normal everyday activities.

One might consider broadening this context-aware approach to include, for example, pre-existing research on detecting whether two devices share a common physical environment. For example, two devices verify their shared physical proximity based on the shared properties of received radio signals, and one could naturally create similar approaches based on audio or light signals.

From a consistency perspective, one achievement of the present, novel approach is that a person is not forced to take a card out of their billfold wallet or purse wallet. Furthermore, it is possible for users to perform all additional actions within at most one second. However, if necessary, in one embodiment of the present invention, Secret Handshakes are combined with other techniques, such as the button press.

While intuitively motions like "key turn" might appear fairly unique, simply the act of taking one's wallet out of a pocket is not since a user may take their wallet out numerous times during the day for various reasons other than authentication. Accordingly, the one embodiment of the present approach asks the user to slightly modify their usage model with the addition of a secret handshake.

Secret Handshakes

Figure 2A:
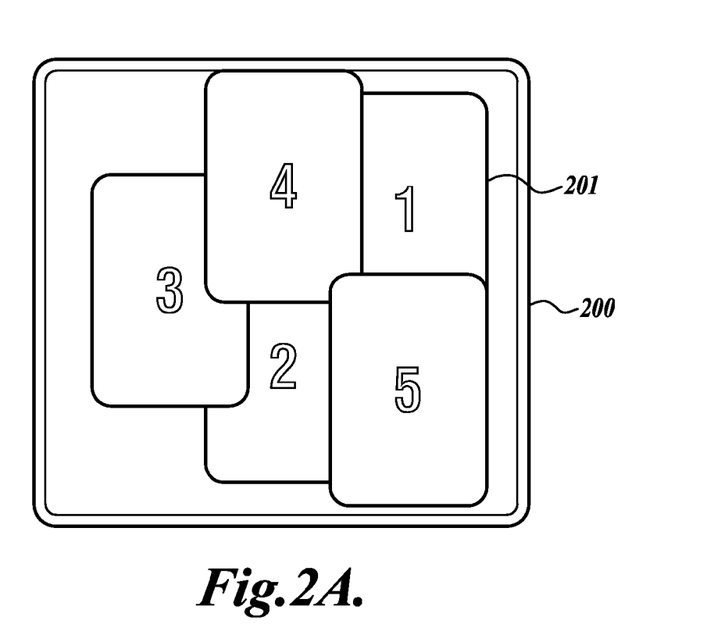
FIGS. 2A and 2B illustrate an exemplary secret handshake/activation scheme.
Figure 2B:
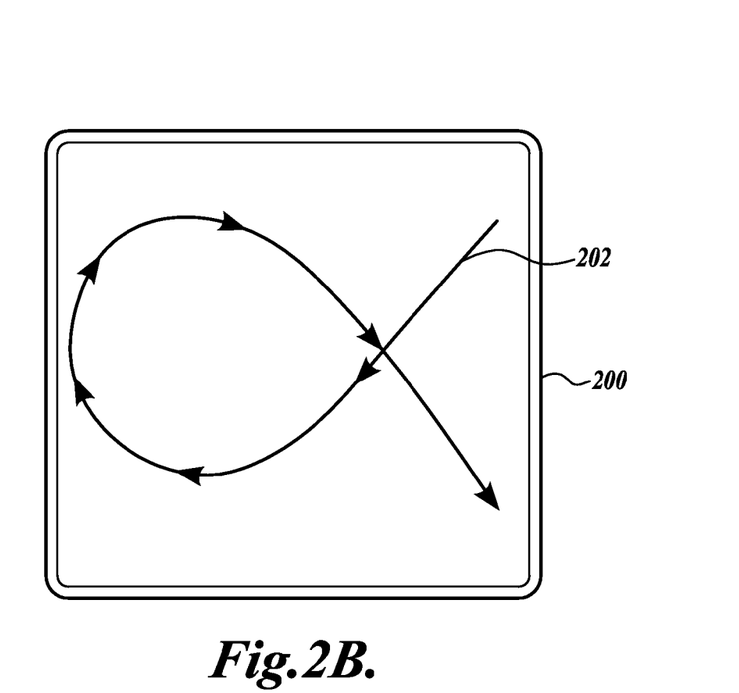

Conceptually, a secret handshake is a series of time-constrained physical actions—or gestures—which an individual must perform with the RFID tag or contactless card (or wallet, if the tag or card is in the wallet) in order to "unlock" the card and permit it to communicate with a card reader. As used herein, the term "secret handshakes" is also referred to as "activation schemes" and these terms are used interchangeably. Some examples of secret handshakes include:

Alpha—User moves card in an alpha (α) pattern in front of reader. (An example of this activation scheme is shown in FIGS. 2A and 2B. The numbers 1, 2, 3, 4, 5 in FIG. 2A indicate a sequence of card positions 201 across thereader 200 with time. FIG. 2B includes arrows 202 that show how the card moves across the reader 200 with time.)

Key Twist—User makes key turning motion with the card.

Hip Twist—User keeps card in his/her pocket and twists hip to bring pocket within reading range of the reader.

Circle—User moves card in a circular manner, parallel with the surface of the reader.

Double Circle—User makes two consecutive circles with the card.

Triangle—User moves card in a triangular pattern parallel with the surface of the reader.

1-left-1-right—User waves card side to side (once left, once right) in front of the card reader.

1-right-1-left—User waves card side to side (once right, once left) in front of the card reader.

Figure 3:
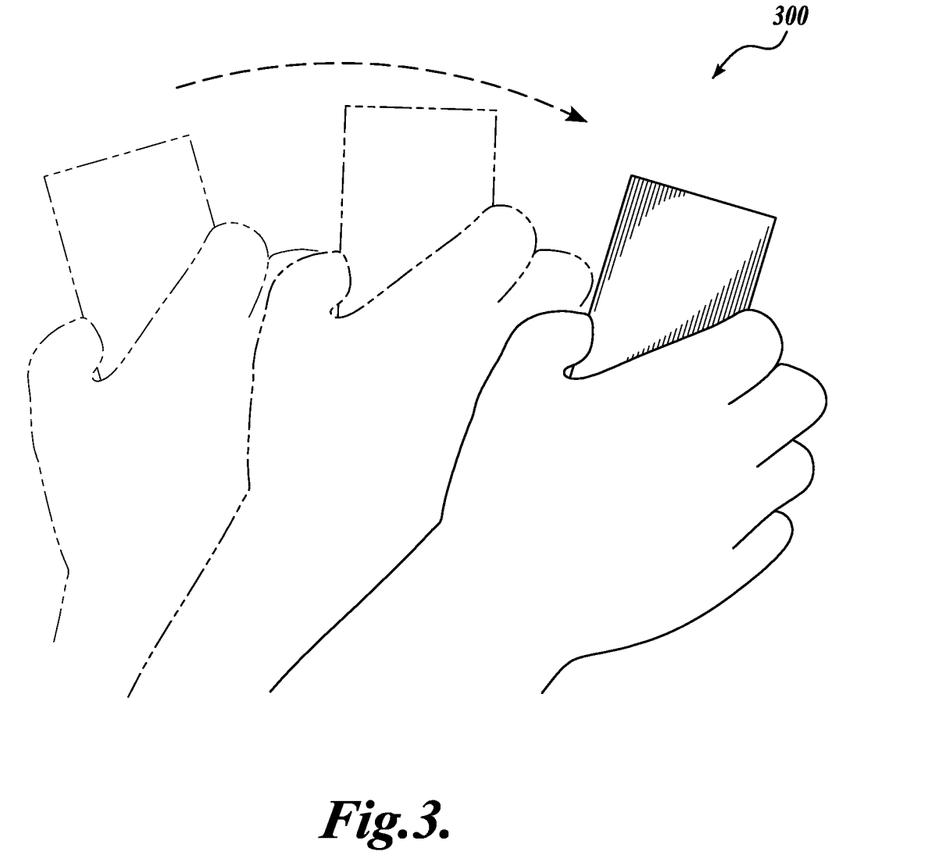
FIG. 3 illustrates an exemplary secret handshake/activation scheme demonstrating the 1.5-wave gesture.

1.5-wave—User waves card side to side (once right, once left, once right) in front of the card reader. (An example of a user 300 waving a card side to side in this activation scheme is shown in FIG. 3.)

Ideally, the accelerometer fingerprint of these motions would significantly differ from those which are produced during everyday activities (such as sitting, eating, walking, running, and jumping) in order to prevent an attacker from capturing signals during those activities. In one embodiment, a more precise secret handshake is achieved by equipping the contactless card with a battery and additional computational resources.

Context Detection on the Card or Reader

Processing of the accelerometer readings can either be performed directly on the RFID tag or contactless card or can be encrypted and sent to the reader for processing. In one embodiment, processing of the accelerometer readings is performed directly on the RFID tag or contactless card. Specifically, signal processing on the card uses limited resources such as memory (for buffering samples) and CPU. However, signal processing on the card allows it to only transmit data when the user explicitly authorizes the transfer through the correct physical manipulation of the card and requires no modification of the reader, making it backwards compatible with current systems. Additionally, there may be instances when the tag is able to collect and process accelerometer data but unable to send it to the reader; for example, RF interference from other 900 MHz ISM-band devices could corrupt bits in the communication channel without significantly affecting the power received by the tag. Signal processing on the card is also independent of any reader behavior (except that the reader must be sending some RF energy to power the card), so selective forwarding attacks (where an attacker drops some samples in order to massage a signal into something a reader might accept) are not possible.

In another embodiment, the accelerometer readings are encrypted and sent to the reader for processing. Signal processing on the reader has greater resources. It requires the constant transmission of accelerometer data by the card, which also means that the card must encrypt and authenticate the data being sent in order to prevent easy replay attacks. Furthermore, this latter approach is not backwards compatible with current systems.

WISP Overview

In order to meet the design goals of cost effectiveness and backwards compatibility with existing readers, a method is presented for performing authentication context recognition on a completely passive RFID card. In one embodiment, the WISP platform that is available from Intel Research in Seattle, Wash. is used, because it is a passive RFID device that is completely programmable. The WISPs combine a Texas Instruments MSP430F1232™ 16-bit microcontroller (with 8 KB of Flash and 256 bytes of RAM), with an Analog Devices ADXL-330™ 3-axis, ±3 g accelerometer. The WISPs communicate using the EPC Class 1 Gen 1 standard, though the EPC Class 1 Gen 2 standard or ISO 14443 may also be utilized.

Figure 4:
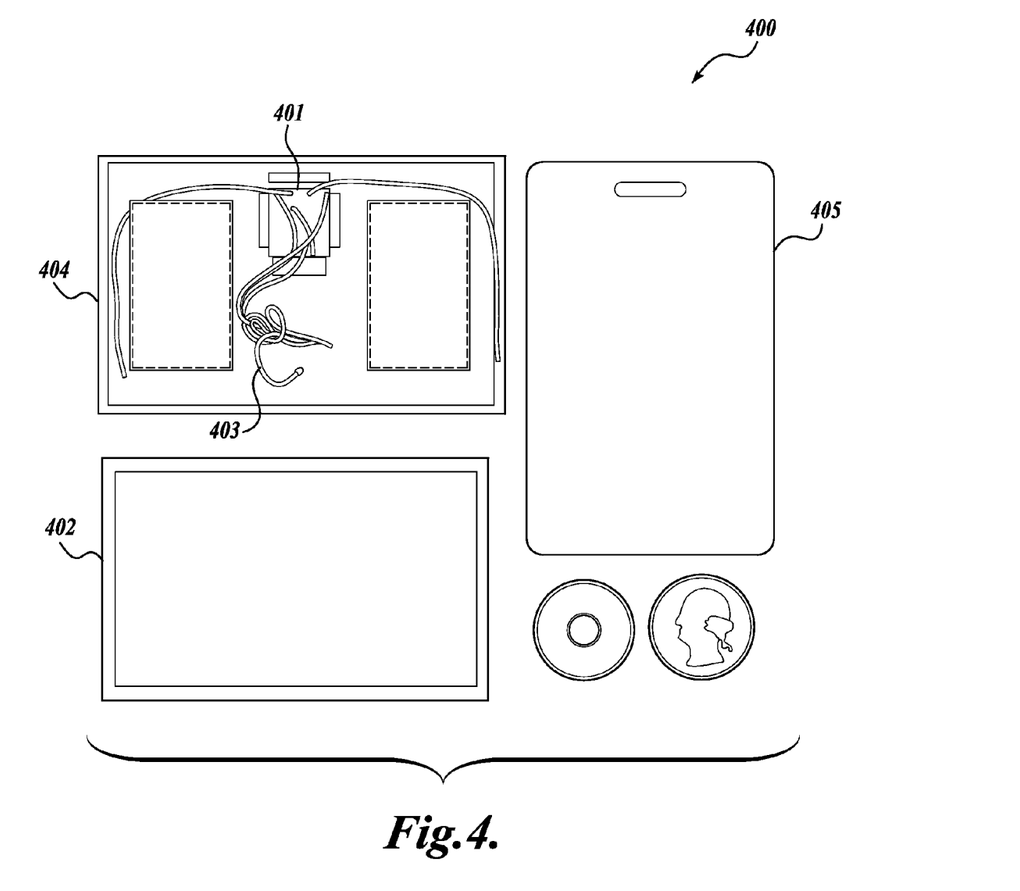
FIG. 4 illustrates a prototype WISP RFID system.

When the present invention was developed, for experimentation purposes and durability, the WISP was enclosed in a plastic box measuring 85.60 mm×53.98 mm×7.5 mm. The width and length match the standard ISO 7810 ID-1 size used by most access control badges. While the box is slightly thicker than the ISO 7810 ID-1 standard, an actual deployment of the WISP in access badges would come very close to or even match the standard width. An image of this exemplary prototype WISP system 400 is shown in FIG. 4. The prototype WISP 401 is enclosed in a custom plastic box 404, showing wires 403 extending from the back for debugging and tethered experiments, and including a box cover 402. A standard HID proximity card 405 is also shown.

System Overview

The exemplary overall system used for the novel approach has three phases. In the first phase, a person performs the target action one or more times, and the accelerometer readings for that action are recorded and serve as a template with which future actions will be compared. This template can be on a per-person basis or generic, meaning that multiple people performing the same action may have different templates. This template is then loaded on the WISP tag.

The WISP implementation itself has two general states: activation scheme (or context) recognition, and RFID transmission. In the context recognition state, the system continuously samples the accelerometer and runs a recognition algorithm against a window of these samples, until it runs out of power. If the recognition algorithm determines that an activation scheme has been performed, then the system transitions into the RFID transmission state, which, in one embodiment, implements the EPC Gen 1 protocol to transmit a static identifier for approximately two seconds. Note that, if desired, the accelerometer sample buffer can be reused at this point to implement a cryptographic challenge/response protocol as has previously been done on the WISPs.

Context-Recognition on the WISP

To recognize a particular secret handshake, the cross-correlation C of the accelerometer data window A is computed against a template T of the scheme, both of size n data points:

$$C = \sum_{i=1}^{n} (A_{xi}T_{xi} + A_{yi}T_{yi} + A_{zi}T_{zi}). \tag{1}$$

In one embodiment, transitions are used to the RFID transmission state when C exceeds a certain threshold. Ideally, it would be desirable to perform normalized cross-correlation to reduce the impact of high magnitude samples, which is a standard technique in signal processing but more efficient than standard gesture recognition techniques. However, the lack of DSP features on the microcontroller make normalized cross-correlation extremely slow. Instead, this exemplary technique simply zeroes out samples where any of the axes exceed their magnitude thresholds, which are set such that they will rarely be exceeded when performing an activation scheme. Naturally, it is accepted that an implementation of gesture recognition techniques on a more powerful tag or contactless cards with greater resources would yield recognition results at least as good as those discussed below.

To minimize the number of cycles needed to perform the cross-correlation, a number of tricks are employed by taking advantage of the fact that each position in the accelerometer data window is multiplied by a fixed template value. The microcontroller can perform addition and subtraction in hardware, but cannot perform multiplication. Instead of calling the generic multiplication function for each sample and adding the results together, the distributive property of integers is used to add the samples that will be multiplied by a common template value first, and then do the multiplication.

This calculation can be further optimized by decomposing the multiplications into the summation of multiplications of powers of 2. There are eight registers (one per bit), and each accelerometer sample can be added to each register that corresponds with a 1 bit in its template multiplier. For example, if accelerometer sample $A_{x2}$ is multiplied by the template value 9, we add $A_{x2}$ to registers $R_1$ and $R_8$.

Expressing the multipliers as canonical signed digit numbers enables minimizing addition operations by substituting many of them for a single subtraction operation, which is equally cheap on the microcontroller. For example, if accelerometer sample $A_{y7}$ is multiplied by the template value 31, instead of adding $A_{y7}$ to $R_1, R_2, R_4, R_8$, and $R_{16}$, $A_{y7}$ is added to $R_{32}$ and subtracted from $R_1$. Each multiplication is then a simple bit shift, and adding the eight registers together provides a cross-correlation value. Perl script is used to automatically produce optimized C code to perform these operations without any branching.

Building Context Templates

With cross-correlation implemented on the WISP, the final challenge is choosing values for the three major variables to the present novel system: the context template, the magnitude filtering thresholds, and the cross-correlation detection threshold. To explore the space, three participants were asked to perform a variety of secret handshakes and carry the WISP around while performing day-to-day activities. To do this, the exemplary prototype was modified to enable it to be externally powered and provide accelerometer data over a serial line. Intel Research's (Seattle, Wash.) Mobile Sensing Platform™ was modified to power the WISP and store its accelerometer data. The data were then imported into MATLAB™ for analysis.

Traces of template examples were automatically split into individual templates using a simple algorithm that found n 48-sample windows with the highest magnitude. Samples toward the middle of the window were weighted slightly higher to ensure that if the action was less than 48 samples long, it was performed in the middle of the sample window.

Each instance of an action was then compared to the day-to-day activity traces and to other instances of the activity to determine the appropriate cross-correlation detection thresholds. In several instances, there were clear regions of the threshold value where no false positives or false negatives were detected. For the magnitude filtering thresholds, the minimum and maximum value of each axis in the gesture instance were chosen for use. An attempt was made to multiply these values by some constants, but in all cases, the false positive rates went up while the false negative rates remained the same.

Evaluation

In order to evaluate this novel approach, this novel system was studied in two phases: tethered, and untethered. Phase 1 was used to identify the most effective secret handshake templates by analyzing the false positive rate (when the system recognizes an authentication scheme when none occurred) and false negative rate (when the system does not recognize an authentication scheme when one did occur). For the former, an attacker was considered that could constantly (or selectively) leech onto the WISP at all times during one's day-to-day activities. Phase 2 mainly concerned utility and involved analyzing the false negative rate with respect to missed data reads that may occur during real authentication sessions. The experimental evaluations discussed herein consider three participants, $P_1$, $P_2$, and $P_3$.

Phase 1: Tethered—Choosing a Secret Handshake Template

In phase one, the WISP was tethered to an external power source and data logger. This step simulates an attacker with an RFID reader that is continuously close enough to the victim to constantly power the WISP and receive responses, and enabled placing an upper bound on the percentage of time that an attacker will be able to elicit a response from the tag. The tethered WISP also enables collecting more accurate secret handshake template candidates by streaming the accelerometer readings from the WISP to the connected device via a wire. The alternative would be to collect the templates either: (1) on the WISP; or, (2) transmit data over the RF channel. These template candidates were then analyzed in MATLAB™.

TABLE 1

Maximum slack.

| Action | P1 Slack | P2 Slack | P3 Slack |
|---|---|---|---|
| Key Twist | 2500 | 3800 | −3600 |
| Hip Twist | −700 | −1100 | −2000 |
| Alpha | −400 | 100 | 4800 |
| Circle | −800 | 500 | −300 |
| Double Circle | 11400 | 5200 | 1500 |
| Triangle | 1100 | 1600 | 300 |
| 1-left-1-right | −100 | 7400 | 1200 |
| 1-right-1-left | 1600 | 3900 | 3800 |
| 1.5-wave | 1700 | 19800 | 8600 |

The MATLAB™ code automatically picks the best n template candidates for a secret handshake from traces collected of the secret handshake. Accelerometer data was also collected from the WISP from a variety of day-to-day activities for the three participants, such as walking, sitting, standing, fidgeting, playing ping-pong, and riding a bicycle. Next, the WISP's cross-correlation code, reimplemented in MATLAB™, was run on these template candidates against the day-to-day activity traces in order to determine the false positive rate—how often each particular secret handshake gestures were recognized during these activities—for a spectrum of cross-correlation threshold (the threshold at which a match will be made between a template and the target data, see the discussion above for more details). This step was done over the aggregate of all day-to-day activities for all three participants. For each type of secret handshake, each template candidate was also compared to all the other template candidates of the same type and for the same participant, which enabled gauging the expected false negative rate, i.e., how often secret handshake gestures would not be recognized when they did, in fact, occur.

For many of the secret handshakes, a region of thresholds was found where no false positives or false negatives occur. The slack of a secret handshake was defined to be the range of this region. In more detail, consider a single template. Let $Pos_r$ be the maximum threshold at which the false positive rate is non-zero, and let $Neg_l$ be the minimum threshold at which the false negative rate is non-zero. Then the slack for this template is defined as: slack=$Neg_l$–$Pos_r$. Negative values of slack indicate the width of the region where both the false positive and false negative rate is non-zero. The use of slack enables finding the most promising gestures. For each gesture, templates were selected, which resulted in the greatest positive slack, setting the threshold to the mean of the slack region. The maximum slack achieved by the optimal template for each secret handshake and each participant is reported above in Table 1. The double circle and 1.5 wave had the largest range of thresholds where the false positive and false negative rates were zero. The hip twist performed worst—it yielded a large section of thresholds where the false positive and false negative rate was non-zero.

TABLE 2

Untethered False Negative Rate. Each participant attempted the secret handshake 50 times in front of two different readers, every attempt resulting in a successful authentication.

| Reader | P1: 1.5-Wave | P2: 1.5-Wave | P3: 1.5-Wave |
|---|---|---|---|
| Speedway | 0/50 | 0/50 | 0/50 |
| Alien | 0/50 | 0/50 | 0/50 |

Phase 2: Untethered—Utility and False Negatives

While in phase 1, the WISP had constant power. In phase 2, non-constant power was captured by untethering the WISP and using a template selected from phase 1 to measure the actual false negative rate.

For each of the three participants in the study, $P_1$'s template for the 1.5-wave secret handshake was used, with the threshold set to the mean of the slack region for $P_1$'s template. Each of the participants was allowed up to 5 minutes to re-familiarize themselves with the 1.5-wave motion. The participants then performed the secret handshake 50 times. If their movement permitted them to authenticate, the attempt was marked as successful, otherwise it was recorded as a false negative. Each of the participants achieved 0 false negatives for 50 attempts of the secret handshake; these results are reported above in Table 2. Each of the attempts lasted less than a second. Even though the participants' gestures varied as their hands fatigued through the 50 attempts, the novel approach was still sufficiently robust to achieve a zero false negative rate.

These experiments were performed with two different RFID readers in order to eliminate any reader bias from the results. The experimental setup consisted of an Alien ALR-9780™ RFID (EPC Gen 1 and 2) reader and an Impinj Speedway™ RFID Reader, which were both connected to a separate circularly-polarized, 6 dBi gain antenna. A GPIO pin on the WISP was monitored with an oscilloscope to determine if a gesture had been recognized Note that the WISP was entirely powered by RF in both instances, and upon recognizing the secret handshake, transmitted its ID to the Alien Gen 1 reader. False positives were not evaluated in the untethered mode since that mode does not model the worst case scenario, in which an attacker is able to constantly power the WISP with an RFID reader. This analysis was performed by the tethered analysis in phase 1.

Since the model used for context-aware communications and secret handshakes is new, it is prudent to reflect upon the security properties that the overall approach—and the WISP-based RFID exemplary prototype—provide. Recall that one goal is to protect against surreptitious reads and proxying of wireless RFID tag and contactless card communications, while at the same time allowing the tags and cards to achieve their primary functions (e.g., enabling a user to legitimately enter a building or start a car, for example).

Given this goal, for many applications it would be sufficient to simply raise-the-bar against the ghost-and-leech attack by decreasing the windows of opportunities at which the tag or card would be vulnerable to attack, i.e., reduce the times in which the tags or cards would incorrectly conclude that the secret handshake is being performed, when in fact, it is not. For all three participants, five of the secret handshakes had threshold regions that resulted in both zero false positives and zero false negatives. But these results suggest that the secret handshakes 1.5-wave and double circle might be reasonable gestures to assign to all people in an organization or company. Alternately, recalling that templates can be chosen on a per-person basis, it would also be reasonable to allow participant $P_1$ to use double circle as his or her secret handshake, and participants $P_2$ and $P_3$ to use 1.5-wave as their secret handshakes.

While Table 1 seems to indicate that hip twist is less desirable than the other gestures and secret handshakes, it may be the case that the hip twist motion will still provide adequate security in some cases. First, the false positive rates recorded in the study emulate an ideal attacker monitoring a person during day-to-day activities, i.e., an attacker capable of placing an RFID reader near the victim card constantly throughout activities, such as bicycling. Real attackers might not have such capabilities. Additionally, if we were to weaken the utility goal and not demand near-zero false negatives, then it would be possible to set the threshold for hip twist to a higher value, thereby further reducing the false positives during day-to-day activities.

It is also important to evaluate the false positive rates in environments other than day-to-day activities. It is likely that some motions—like dancing with a wallet holding a RFID tag or contactless card in their pocket—may generate motions similar to some of the secret handshakes. Such correlations, if found to be true, may not significantly impact the usefulness of secret handshakes in practice, since secret handshakes can still limit the exposure of a person's tag or contactless card in the common case. Nevertheless, this discussion motivates a new class of attacks that is referred to herein as the "ghost-and-dancer" or "dancing-leech" attack, in which one attacker attempts to coerce a person into moving in a particular manner, perhaps by encouraging him or her to join in a dance in which the attacker is able to directly or indirectly manipulate the card's motion.

Finally, it is important to consider more sophisticated adversaries that attempt to not only relay the communications between the RFID tag or contactless card and the reader, but who attempt to directly modify the physical state on the tag or card. For example, since the WISPs are powered by the energy received from the RFID reader, we must ask whether a malicious RFID reader could influence the accelerometer sampling frequency, clock, or some property of the WISP. While this event certainly appears infeasible given off-the-shelf readers, a preliminary analysis also suggests that such attacks would be difficult to mount even with custom RFID readers, because the voltage from the WISP power harvester is regulated at approximately 1.8 volts, keeping the microcontroller's oscillator stable. If 1.8 volts is not available, the voltage supervisor resets the microcontroller before it is able to affect the operation of the WISP.

Survey of Access Card Usages

A survey was conducted to determine how students, faculty, and staff at the University of Washington use access control cards to gain entry to buildings, rooms, and other secured locations. A total of 554 people responded to this survey. Of these, 44 had never used an access card or access badge and hence, were excluded from the rest of the survey. Of the 510 remaining participants, 354 were male, 150 were female, and six did not provide a gender. The retained participants were also predominantly in the 18-28 year range (403 participants), with 53 participants aged 29-38, 21 participants aged 39-48, 24 participants aged 49-58, and five participants aged 59-68. Four participants did not provide an age.

These 510 participants were asked what kind or kinds of access cards they have or have had in the past: contactless, contact-based (e.g., magnetic stripe or smartcard), or both. Of these participants, 208 are currently or have used one or more contactless access cards, 248 are currently or have used one or more contact-based access cards, and six have used one or more of both types of cards; 48 did not provide an answer. The participants were then asked a sequence of questions to ascertain where they keep or have kept their access badges. Since one of the primary goals of this novel approach is to protect against the ghost-and-leech attack, while maintaining approximate consistency in the usage model for RFID tags and contactless cards, it was critical to ascertain how people are currently using their contactless access cards. Therefore, while these questions were asked of all participants, the following discusses only those participants that are currently using or have used contactless access badges in the past. In order to avoid double counting individual participants who had multiple cards (and perhaps kept them in the same or different locations), the following focused on participants that only ever used one such contactless access card. This limitation left 191 participants.

The questions were hierarchical in nature, structured in a way that would enable determining the precise location in which the participants normally carry their access cards. For example, if a participant indicated that he or she kept his or her access card in a wallet, that participant was subsequently asked where he or she usually kept that wallet (e.g., in a front pocket, in a back pocket, in a backpack, in a purse, around the neck, or in some other location).

Figure 5:
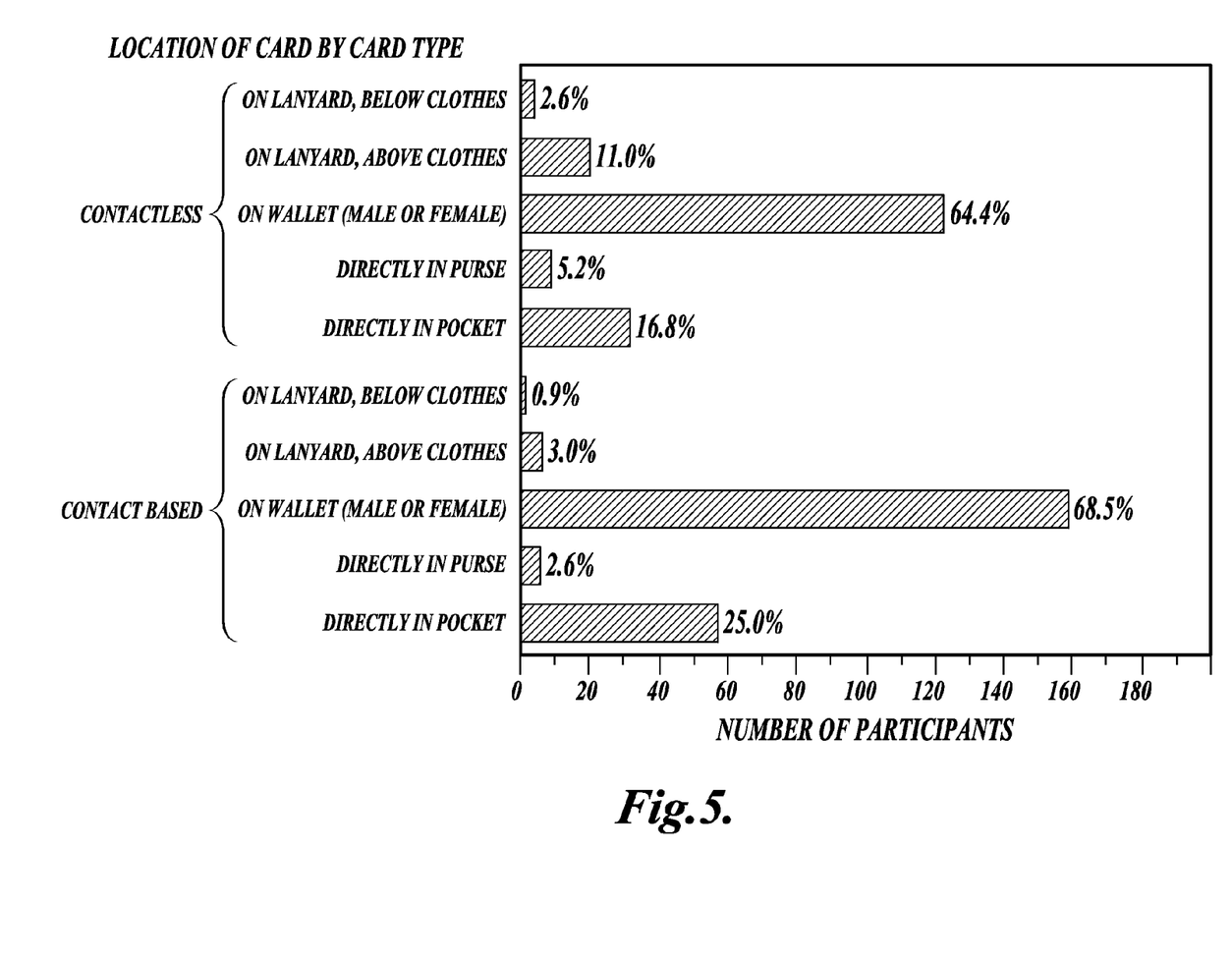
FIG. 5 is a chart illustrating locations where survey participants keep or kept their access cards by card type.

FIG. 5 presents a summary of the results of this study. Of the 191 participants that qualified for this portion of the study, 123 (64.4%) kept their access card in their wallet, 32 (16.8%) loosely jammed the card in their pocket, 21 (11%) wore them on a lanyard around their neck and above their clothes, ten (5.2%) loosely jammed them in their purse, and five (2.6%) wore their card on a lanyard below their clothes.

The 191 participants who have only used one contactless access badge were then asked how they use or used that access badge to gain entry to a physical resource. (For example, do participants with contactless access cards wave their wallets in front of the badge reader? Do they remove their cards from their wallets before pressing them to the badge reader? Or, do they use some other technique?)

Figure 6:
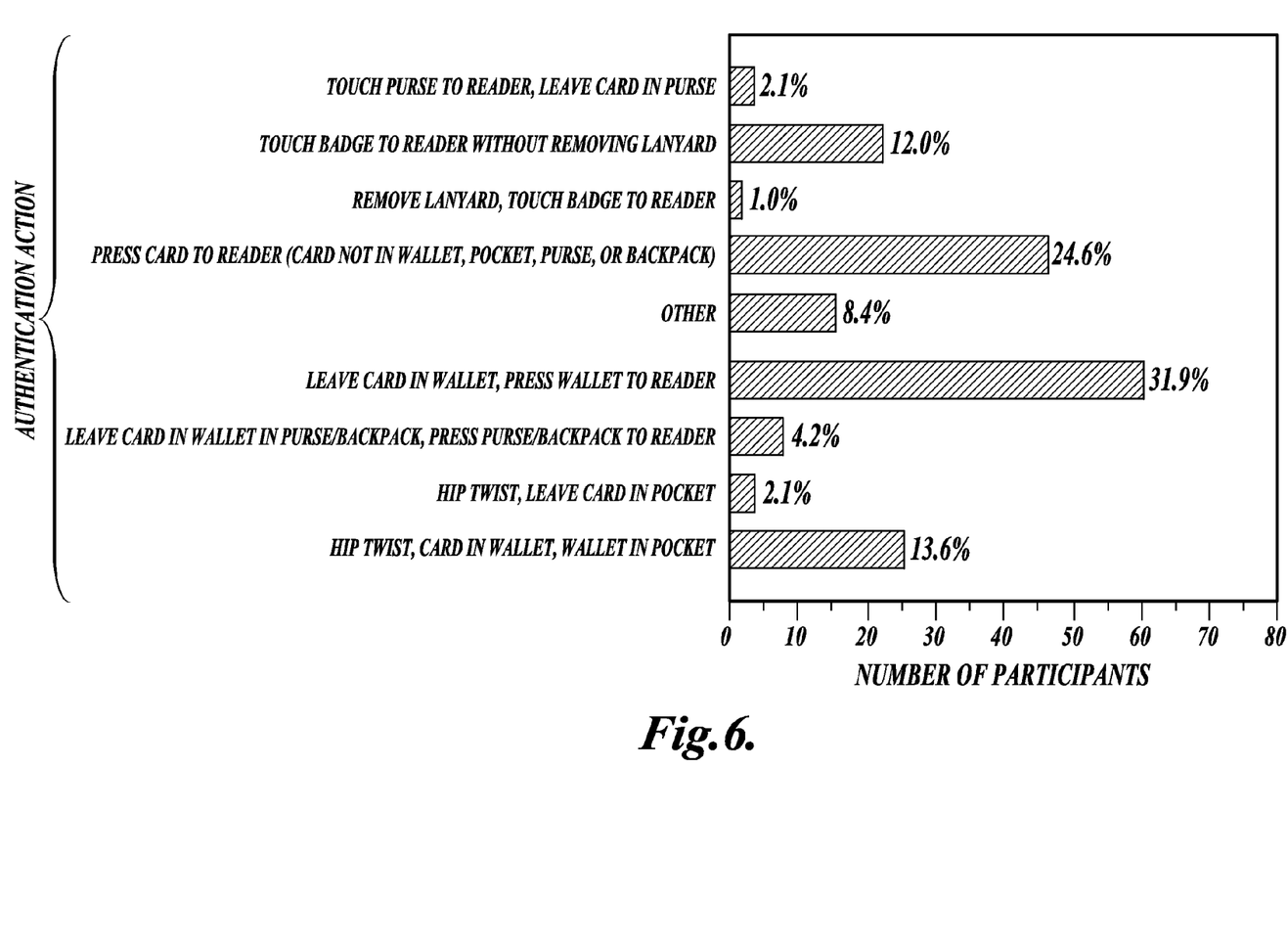
FIG. 6 is a chart illustrating how survey participants use or used their contactless access cards.

FIG. 6 presents a summary of these results. Over a third (31.9%) of the participants authenticated by taking their wallets out of their pockets and pressing their wallets against the card reader without removing their card from the wallet. Less than a fourth (24.6%) of the participants removed their card from their wallet, purse, or pocket and brought it near the reader. These results do indeed support the expectation that a secret handshake, which would not require a user to take the access card out of their wallet, would be beneficial to a large portion of contactless card users.

The study included 232 participants who had never used a contactless card, but do have an electronic access card (e.g., magnetic stripe card). Again these results only include participants with one such card. Of these participants 159 (68.5%) kept the card in their wallet, 58 (25%) kept the card in their pocket, and 15 (6.5%) of the participants kept the card in a purse or lanyard. FIG. 5 illustrates these results. If given a contactless card, these users may want to keep their card in the same location. Consequently, a secret handshake would allow these users to do just that, while simplifying their usage model.

The survey participants were also asked whether it was more important that their access card worked quickly or worked securely—where "securely," in this context, was explained to be the inability of an attacker to clone their access card or gain entry while posing as them. In response, 287 (67.85%) people said that it is important to be quick, while 92 (21.80%) said it's important to be secure; and 44 people chose "other" or did not respond. The distributions are similar for both the participants that had contactless cards and those that didn't. This highlights the fact that security administrators and users are often at odds with one another concerning authentication—users want speed and utility, administrators want security. It appears that secret handshakes can provide a nice compromise between these two priorities, by making authentication more secure without incurring a major usage model modification.

Survey Summary:

The survey included 554 people from a variety of backgrounds and ages. Although, for many of the questions, there were not 554 total replies, the survey revealed the following interesting facts:

1. Users mostly keep their access cards in their wallet.
2. A large portion of the users who have contactless access cards do not remove them from their wallet during authentication.
3. Users overwhelmingly value quickness over security. These observations strengthen the proposal to use secret handshakes, by showing that speed is important, and that secret handshakes will only negligibly impact the current authentication model.

Contactless technologies, including smartcards, proximity cards, and RFID-based devices, are constantly increasing in ubiquity in such applications as access control and payment systems. These contactless technologies are vulnerable to a class of relay attacks called ghost-and-leech attacks. The preceding discussion explains a novel approach for adding a level of protection against the ghost-and-leech attack by limiting the context in which the contactless card can communicate with a reader. It has been shown that by asking users to perform secret handshakes—short, small gestures with their cards during their authentication session—the resistance of the contactless cards to ghost-and-leech attacks can be greatly increased, without significantly altering the usage model.

Although the concepts disclosed herein have been described in connection with the preferred form of practicing them and modifications thereto, those of ordinary skill in the art will understand that many other modifications can be made thereto. Accordingly, it is not intended that the scope of these concepts in any way be limited by the above description.

The invention claimed is:

1. A method for enabling communication between a tag and a reader configured to read the tag, the method comprising:
- determining, by at least one component associated with the tag, a pattern of movement of the tag;
- comparing, by a microcontroller carried by the tag, the pattern of movement with a predefined pattern of movement, wherein comparing the pattern of movement with a predefined pattern of movement includes calculating a cross-correlation value of the pattern of movement with the predefined pattern of movement; and
- activating the tag based on the comparison between the pattern of movement and the predefined pattern of movement;
- wherein an instruction set used by the microcontroller for calculating the cross-correlation value of the pattern of movement with the predefined pattern of movement does not include a multiplication instruction.

2. The method of claim 1, wherein the predefined pattern of movement includes at least one of: alpha, key twist, hip twist, circle, double circle, triangle, 1-left-1-right, 1-right-1-left, and 1.5-wave.

3. The method of claim 1, further comprising receiving an input from a user for initializing the tag for activation.

4. The method of claim 3, wherein the input includes the user moving the tag according to a pattern to establish the predefined pattern.

5. The method of claim 3, wherein the input includes the user selecting the predefined pattern from a plurality of predefined patterns.

6. An access card that is configured to carry a tag configured to perform the method of claim 1.

7. The access card of claim 6, further comprising a motion sensor configured to detect motion corresponding to the pattern of movement.

8. The access card of claim 7, wherein the motion sensor comprises an accelerometer.

9. The access card of claim 7, wherein the tag includes a radio frequency identification (RFID) tag that is configured to be activated based on the detected motion of the motion sensor.

10. The access card of claim 9, further comprising a component that is configured to perform at least one of the following actions: storing the predefined pattern, comparing the pattern of movement with the predefined pattern of movement, and/or activating the RFID tag based on the detected motion of the motion sensor.

11. The method of claim 1, wherein activating the tag based on the comparison between the pattern of movement and the predefined pattern of movement includes activating the tag upon determining that the cross-correlation value is greater than a threshold value.

12. The method of claim 1, wherein calculating the cross-correlation value includes performing a normalized cross-correlation to reduce the impact of high magnitude samples.

13. The method of claim 1, wherein calculating the cross-correlation value includes zeroing out samples of the pattern of movement that exceed one or more magnitude thresholds.

14. The method of claim 1, wherein calculating the cross-correlation value includes adding together samples from the pattern of movement to be multiplied by a common value from the predefined pattern of movement before performing the multiplication.

15. The method of claim 14, wherein calculating the cross-correlation value further includes decomposing the multiplication into a summation of multiplications of powers of 2.

* * * * *